(12) United States Patent
Daly et al.

(10) Patent No.: US 7,986,777 B2
(45) Date of Patent: Jul. 26, 2011

(54) STAND FOR DESKTOP TELEPHONE

(75) Inventors: Martin Daly, South Orange, NJ (US); Brian Dinicola, Monroe Township, NJ (US); James Farber, Rumson, NJ (US); Antoinette Mazza, Somerset, NJ (US); Wolfgang Schneider, Frankfurt (DE); Claus-Christian Eckhardt, Hannover (DE)

(73) Assignee: Avaya Inc., Basking Ridge, NJ (US)

( * ) Notice: Subject to any disclaimer, the term of this patent is extended or adjusted under 35 U.S.C. 154(b) by 1000 days.

(21) Appl. No.: 11/556,133

(22) Filed: Nov. 2, 2006

(65) Prior Publication Data

US 2007/0286410 A1    Dec. 13, 2007

Related U.S. Application Data

(60) Provisional application No. 60/811,413, filed on Jun. 7, 2006.

(51) Int. Cl.
*H04M 1/00* (2006.01)
*H04M 9/00* (2006.01)

(52) U.S. Cl. ........................................ 379/454; 379/436

(58) Field of Classification Search ................... 379/446, 379/436, 454; 248/146, 150, 154, 206.1, 248/206.5, 288.11, 309.1, 309.4, 441.1, 452, 248/495, 683

See application file for complete search history.

(56) References Cited

U.S. PATENT DOCUMENTS

| | | | | |
|---|---|---|---|---|
| 3,121,576 A | * | 2/1964 | Schade | 281/33 |
| 4,073,460 A | * | 2/1978 | Dale | 248/441.1 |
| 4,162,055 A | * | 7/1979 | Summers | 248/441.1 |
| 4,796,847 A | * | 1/1989 | Kayner | 248/441.1 |
| 4,830,321 A | * | 5/1989 | Irie | 248/206.5 |
| 4,871,355 A | | 10/1989 | Kikkawa | |
| 5,121,427 A | * | 6/1992 | Gumb et al. | 379/435 |
| 5,577,697 A | | 11/1996 | Accordino | |
| 6,772,986 B1 | * | 8/2004 | Bennett | 248/441.1 |
| D558,192 S | * | 12/2007 | Daly et al. | D14/251 |
| 7,374,142 B2 | * | 5/2008 | Carnevali | 248/206.5 |
| 7,431,251 B2 | * | 10/2008 | Carnevali | 248/206.5 |
| 7,539,523 B2 | * | 5/2009 | Cheng et al. | 455/575.1 |
| 2003/0019996 A1 | * | 1/2003 | Shields | 248/454 |

FOREIGN PATENT DOCUMENTS

GB        2374754        10/2002

OTHER PUBLICATIONS

Office Action from corresponding GB Application No. GB0710194.2 mailed Jul. 9, 2010.

* cited by examiner

*Primary Examiner* — Fan Tsang
*Assistant Examiner* — Phylesha Dabney
(74) *Attorney, Agent, or Firm* — Muncy, Geissler, Olds & Lowe, PLLC

(57) ABSTRACT

A stand allows a user to quickly and easily set the angular orientation of a telephone or other piece of equipment relative to a support surface (e.g. a desktop). The stand is fastened to, and removed from, the equipment without the use of tools by a magnetic attraction. The stand allows a user to tilt the equipment at one of two user-selected angles, to improve access to keys of the equipment and/or to reduce glare on the equipment's display. The display may also be tiltable. The stand provides for at least two course angle adjustments of the tilt of the equipment by the selected orientation of the stand and/or the selected attachment position of the stand relative to the equipment.

27 Claims, 16 Drawing Sheets

STAND FOR DESKTOP TELEPHONE

BACKGROUND OF THE INVENTION

1. Field of the Invention

The present invention relates to a stand for a desktop telephone or similar equipment.

2. Description of the Related Art

A desktop telephone in accordance with the background art has a keypad and a display. The display conveys data to the user, such as caller ID and contact lists. It is important that the display be easily viewable to the user and that the keypad be at a convenient and accessible angle.

Often times, the keypad and telephone display are oriented at a fixed slight angle to the plane of the desktop (e.g. 10 degrees, 15 degrees or 20 degrees). The fixed angle orientation of the display and keypad is a good compromise. If the user places the telephone close to the user on the desktop, the fixed angle orientation (e.g. 15 degrees) is appropriate. However, if the user wishes to free up the immediate desktop workspace in front of the user and moves the telephone toward the rear of the desktop, the angle is no longer optimum.

Another problem resides with office lighting. Typical offices have fluorescent ceiling lighting which can create a glare on the display of the desktop telephone when the display is at a certain angle. Office windows, desk lamps and computer displays are other sources of light in the immediate vicinity of the desktop telephone which can also create a glare on the display of the telephone.

One step toward solving the problems of the background art is a desktop telephone with a tiltable display unit. The display unit allows the user a limited amount of adjustment (e.g. 20 degrees) from the fixed angled orientation of the desktop telephone. This provides some adjustment feature to assist in removing any glare on the display due to overhead lighting and provides some improvements in the convenience of viewing the display when the telephone is placed toward the rear of the workspace on the desktop.

However, the tiltable display unit fails to adjust the keypad to a convenient angle for the user. Also the tiltable display may not provide a large enough angle for the display, when the user places the telephone to the rear of the desktop.

Fixed angle telephone stands are known in the art, and are typically formed of plastic or wood. Such stands are generic to a wide range of telephones and are typically not connected to the telephone itself, which leads to an unstable condition. If the stand is attached to the telephone, it is by some generic attachment means (e.g. banding or double-sided adhesive) to accommodate several style telephones and is unsightly in the immediate workspace of the user.

SUMMARY OF THE INVENTION

It is an object of the present invention to address one or more of the drawbacks of the background art.

It is an object of a first embodiment of the present invention to provide a stand for a telephone, which allows the desktop telephone to assume one of two course angle adjustments relative to the desktop.

It is an object of a second embodiment of the present invention to provide a stand for a telephone, which allows the desktop telephone to assume one of two ranges of course angle adjustments relative to the desktop.

It is an object of the present invention to provide a stand which presents a very integrated look with the desktop telephone, wherein the telephone/stand combination appears to be a single unit, yet will be easily separable for packaging and user adjustment.

It is an object of the present invention to provide a stand which attaches to the desktop telephone by magnetic force, such that the stand will be easy to attach and separate from the telephone by the user without the use of tools and will not damage or alter the appearance of the telephone. Further, the attachment features will not be visible on the product and hence will be attractive in the appearance of the overall product.

It is an object of the present invention to provide a stand in the form of a single fixed-body stand which can provide two very different fixed angles or two very different ranges of angles for the desktop telephone simply by changing the orientation of the stand.

It is an object of the present invention to provide a stand in combination with a telephone having a tiltable display unit feature, such that the display can be oriented at a great range of angles to fit the user's preferences.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 5 is a bottom view of the telephone with the stand removed there from;

FIG. 11 is a bottom view of a telephone in accordance with the second embodiment of the present invention, with the stand removed there from;

FIG. 17 is a bottom view of a telephone in accordance with the third embodiment of the present invention, with the stand removed there from;

DETAILED DESCRIPTION OF A PREFERRED EMBODIMENT

Figure 1:
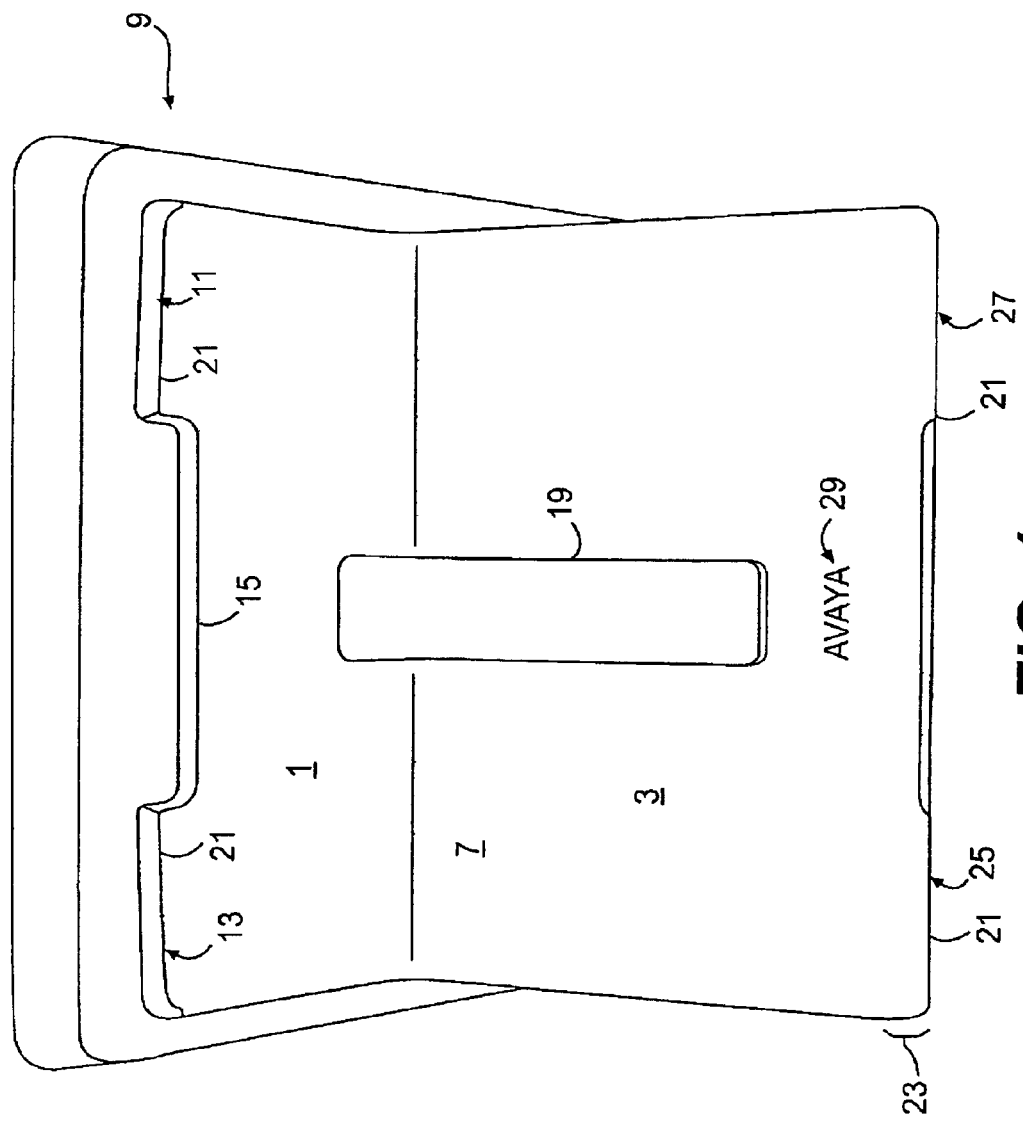
FIG. 1 is a rear view of a telephone with a stand in a first position of attachment to the telephone, in accordance with the present invention.
Figure 2:
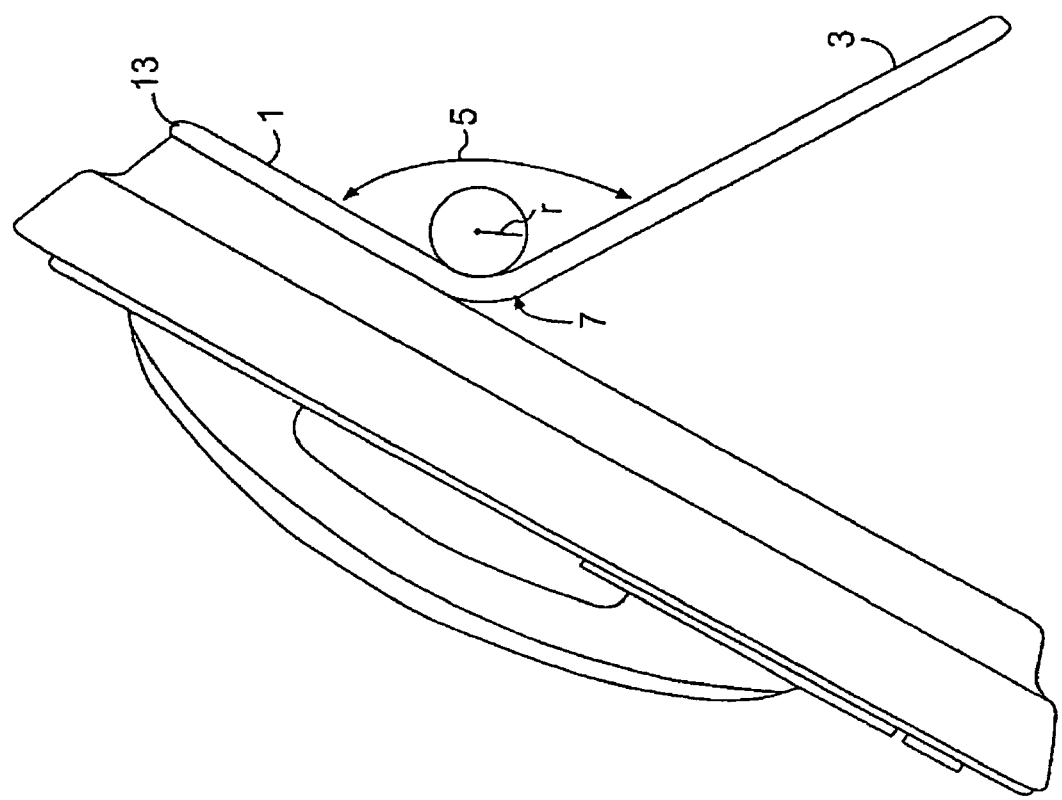
FIG. 2 is a right side view of the telephone with the stand of FIG. 1.

As best seen in FIG. 1, the stand of the present invention is primarily composed of a first generally planar surface 1 and a second generally planar surface 3. The first and second surfaces 1 and 3 are oriented at an angle 5 relative to each other (FIG. 2). The illustrated angle 5 is approximately 120 degrees. However, the angle 5 may be set to another value such an angle between approximately 30 degrees to approximately 150 degrees, more preferably between 60 degrees and 140 degrees, and even more preferably between 90 degrees and 130 degrees, such as 100 degrees or 110 degrees or the illustrated 120 degrees.

The angle 5 is formed at a bent radius portion 7. The bent radius portion 7 has a radius of curvature r which is approximately 1 to 3 mm, although the radius of curvature r may be set to other values. Also, the radius of curvature r may be set to zero, such that the first and second generally planar surfaces 1 and 3 have a linear intersection, with essentially no radius of curvature r.

As can be seen in FIG. 1, a slot 19 is form in a central region of the stand. The slot 19 extends into the first generally planar surface 1 and the second generally planar surface 3. The function of the slot 19 will be described in conjunction with figures to follow.

Figure 3:
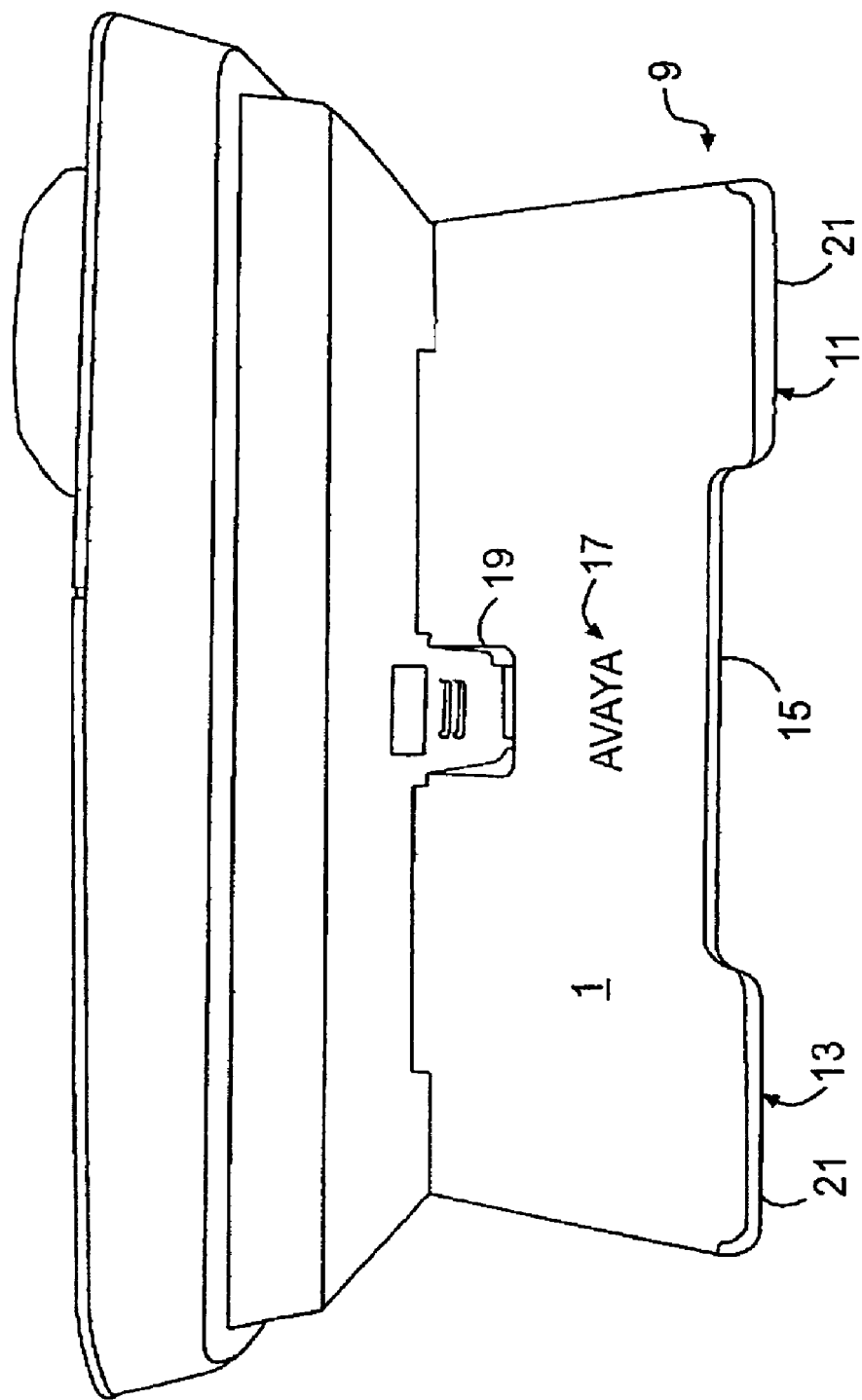
FIG. 3 is a rear view of the telephone with the stand, where the stand is in a second position of attachment to the telephone.

FIG. 1 illustrates a first edge 9 of the first generally planar surface 1. The first edge 9 includes a first foot portion 11 and a second foot portion 13. A rectangular notch 15 is formed between the first and second foot portions 11 and 13. Indicia 17 may be printed on, embedded in, or raised from, the first generally planar surface 1, as illustrated in FIG. 3. Each of the first and second foot portions 11 and 13 is preferably covered with a protective coating or cap 21, such as an anti-slip rubberized material. The cap 21 serves to protect a furniture finish on a surface on which the stand is placed and also serves to resist the stand from sliding on the furniture finish supporting the stand by increasing the frictional resistance to sliding.

FIG. 1 also illustrates a second edge 23 of the second generally planar surface 3. The second edge 23 includes a third foot portion 25 and a fourth foot portion 27. Indicia 29 may be printed on, embedded in, or raised from, the second generally planar surface 3, as illustrated in FIG. 1. Each of the third and fourth foot portions 25 and 27 is preferably covered with a protective coating or cap 21, such as an anti-slip rubberized material. The cap 21 serves to protect a furniture finish on a surface on which the stand is placed and also serves to resist the stand from sliding on the furniture finish supporting the stand by increasing the frictional resistance to sliding.

Although no rectangular notch is illustrated between the third and fourth foot portions 25 and 27, a notch may be included, similar to the notch 15 illustrated in FIG. 3, if desired.

The stand may be formed of a lightweight, durable and strong material, such as plastic or a brushed aluminum or other alloy. Also, the stand may be formed of, or include, a magnetizable material, defined as either a material exhibiting magnetic attraction properties (e.g. lodestone or magnetized metal) or a material which is attracted to a magnet, such as a metal like iron, steel or certain alloys.

Figure 4:
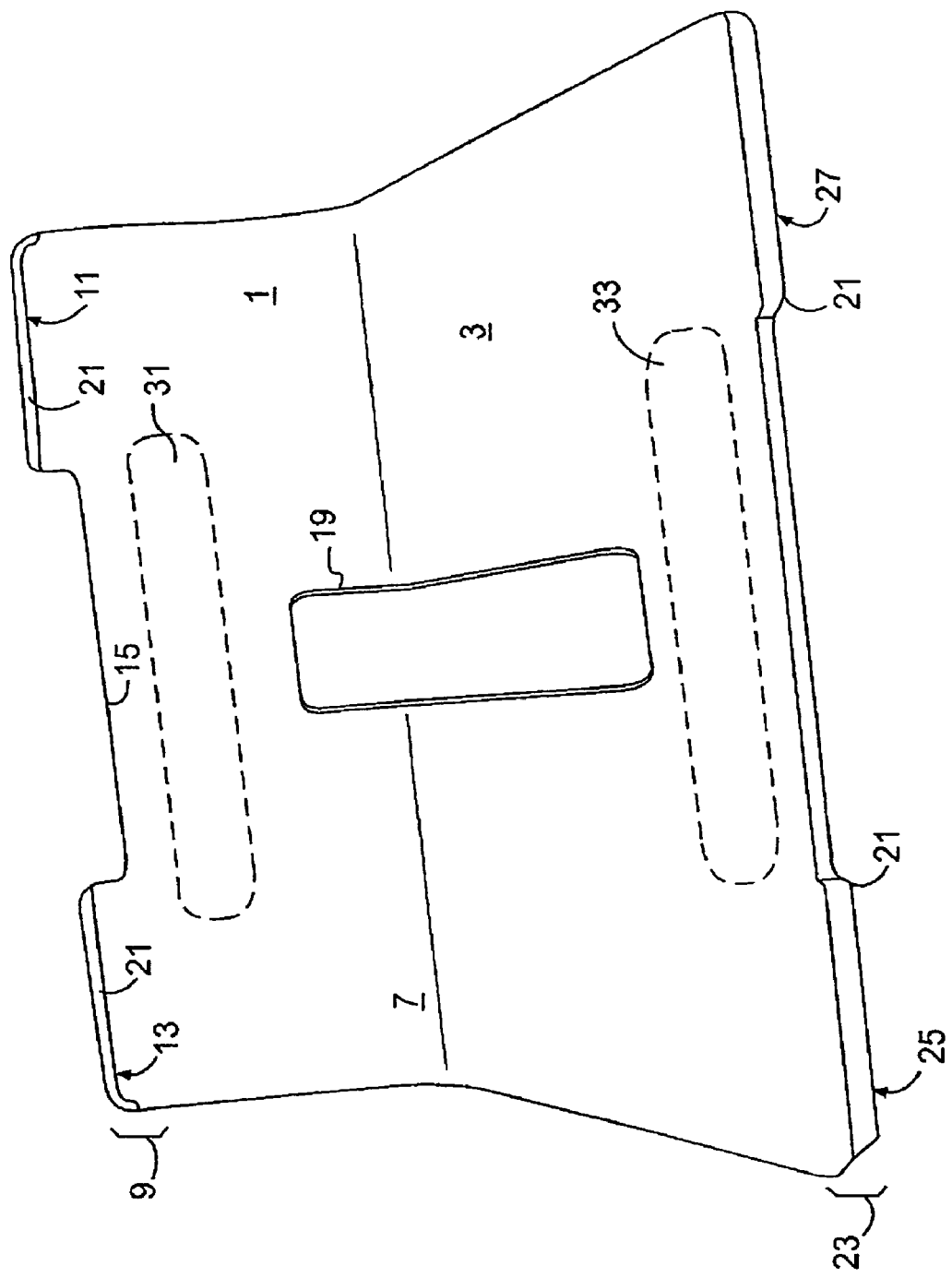
FIG. 4 is a perspective view of the stand alone.

FIG. 4 illustrates one embodiment wherein the stand includes embedded magnetizable material in the form of a first steel plate 31 and a second steel plate 33. The first steel plate 31 is embedded in the first generally planar surface 1 and the second steel plate 33 is embedded in the second generally planar surface 3. Alternatively, the first and second steel plates 31 and 33 may be surface mounted on the first and second generally planar surfaces 1 and 3. It would also be possible to have magnetizable material in the form of fibers impregnated into the entirety of, or portions of, the plastic material during a molding process.

Figure 5:
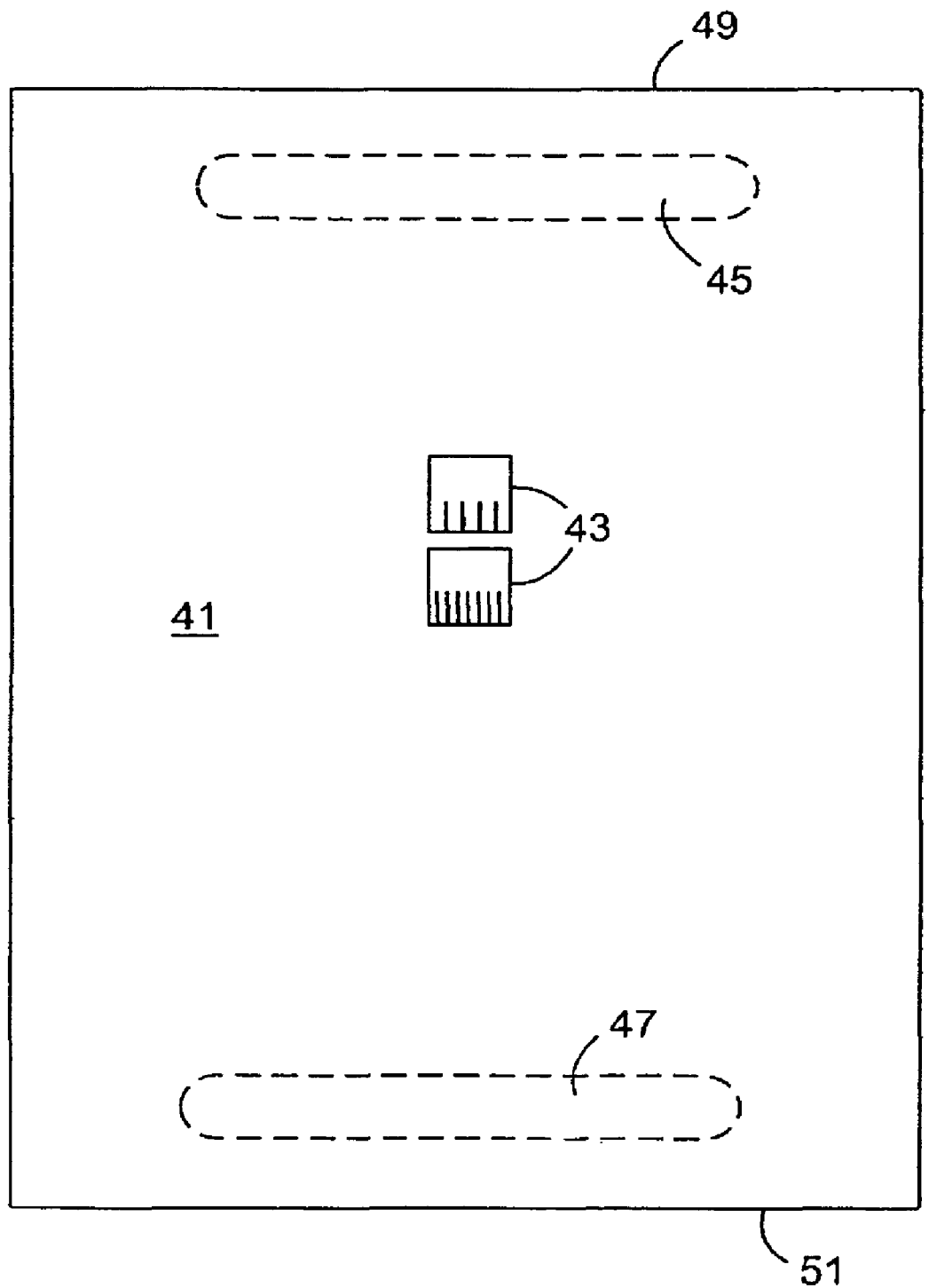

FIG. 5 illustrates a bottom surface 41 of a desktop telephone, in accordance with the first embodiment of the present invention. As can be seen in FIG. 5, the bottom surface 41 of the telephone optionally includes at least one jack 43 for receiving a plug (not shown), such as an RJ-type plug. The bottom surface 41 of the telephone also includes a first magnet 45 and a second magnet 47. The first magnet 45 is located between the jack 43 and a top edge 49 of the telephone. The second magnet 47 is located between the jack 43 and a bottom edge 51 of the telephone.

Figure 6:
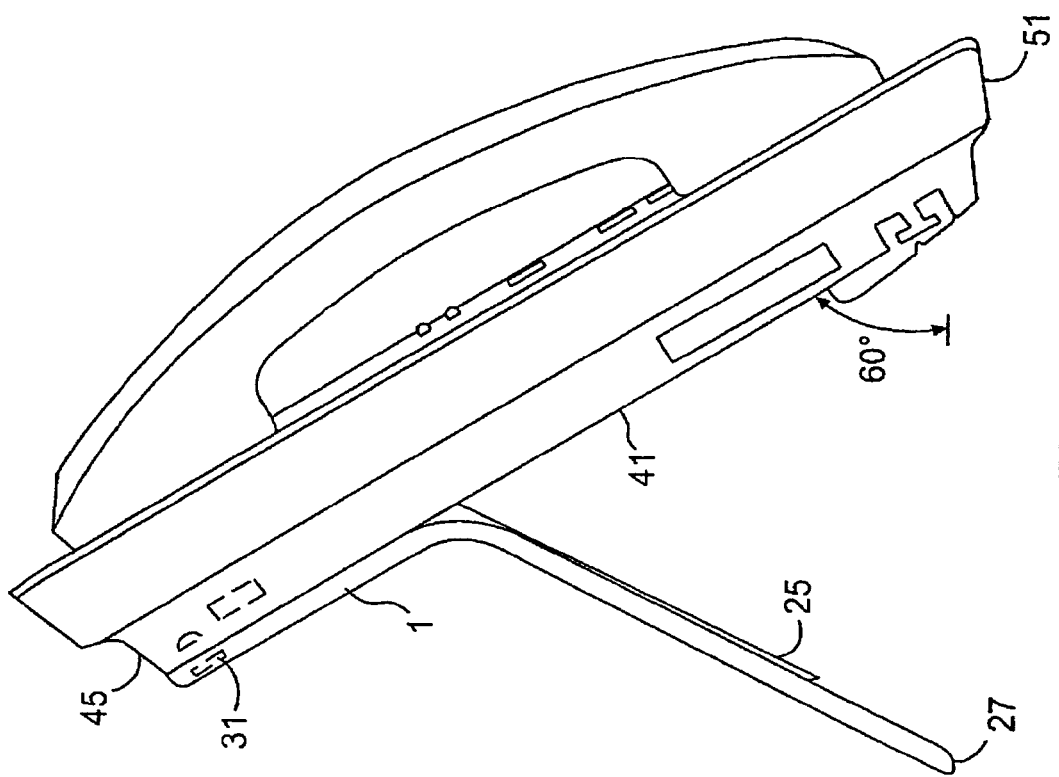
FIG. 6 is a left side view of the telephone with the stand of FIG. 1.

As shown in FIG. 6, when the first steel plate 31 of the stand is placed adjacent to the first magnet 45, a magnetic attraction holds the stand to the bottom surface 41 of the telephone. When the stand is used to support the telephone in this orientation, the third and fourth foot portions 25 and 27 of the second edge 23 of the stand engage the support surface (e.g. furniture surface of a desktop). Also, the bottom edge 51 of the telephone engages the support surface, resulting in the telephone assuming a first angle of approximately 60 degrees relative to the desktop.

Figure 7:
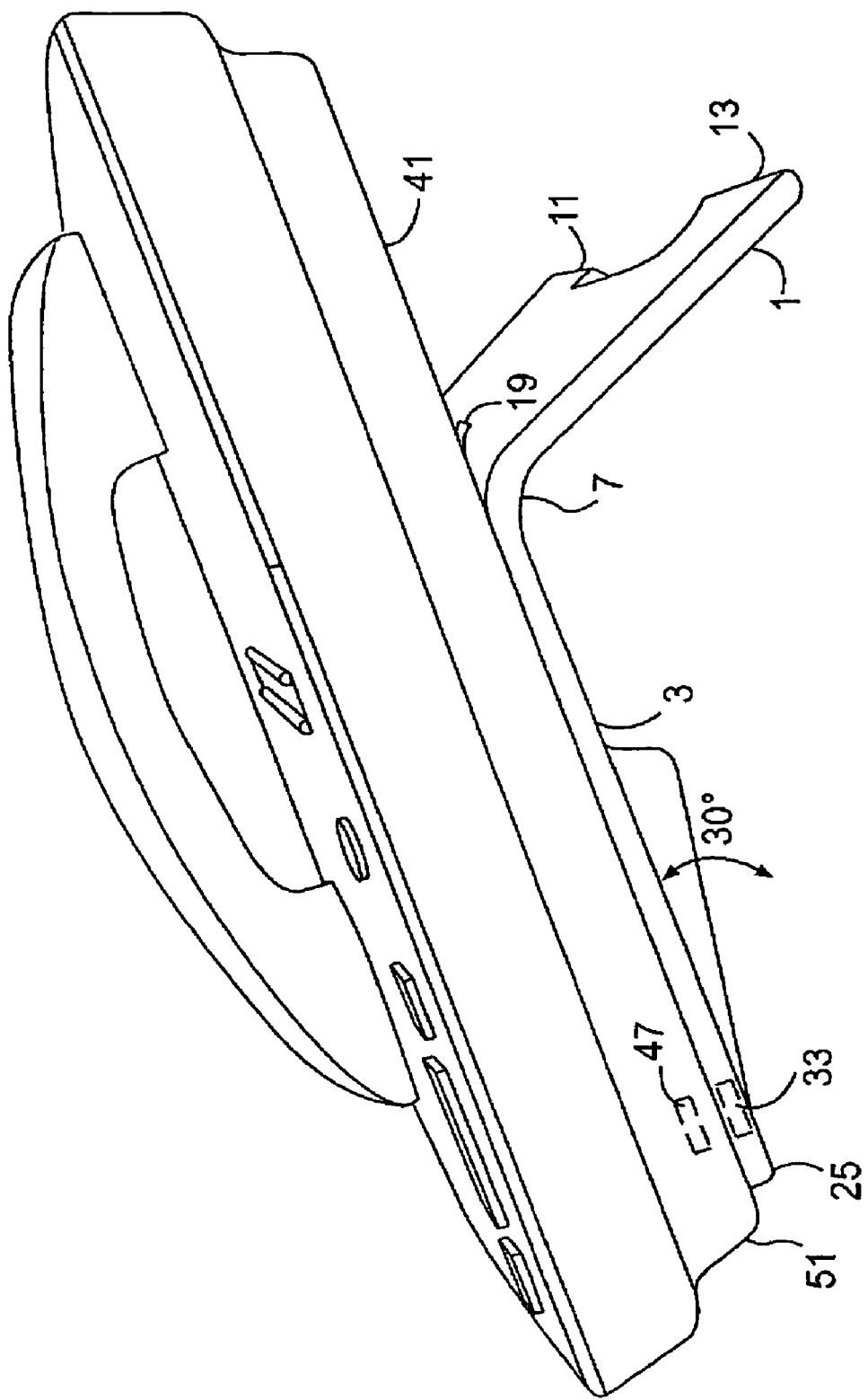
FIG. 7 is a right side view of the telephone with the stand of FIG. 3.

As shown in FIG. 7, when the second steel plate 33 of the stand is placed adjacent to the second magnet 47, a magnetic attraction holds the stand to the bottom surface 41 of the telephone. When the stand is used to support the telephone in this orientation, the first and second foot portions 11 and 13 of the first edge 9 of the stand engage the support surface (e.g. furniture surface of a desktop). Also, the bottom edge 51 of the telephone engages the support surface, resulting in the telephone assuming a second angle of approximately 30 degrees relative to the desktop. Alternatively or in addition, the third and fourth foot portions 25 and 27 of the second edge 23 of the stand could engage the support surface, which would also result in the telephone assuming the second angle of approximately 30 degrees relative to the desktop.

When the telephone is orientated at either the first angle or the second angle, the slot 19 of the stand overlays, or provides access to, the at least one jack 43 on the bottom surface 41 of the telephone.

As can be seen, a first aspect of the present invention is to provide a stand, which can allow a user to quickly and easily set the angular orientation of a telephone relative to a desktop. The stand may be securely fastened to, and removed from, the telephone without the use of tools. The stand would allow a user to orient or tilt a telephone at one of two user-selected angles, to improve access to the keys and functions of the telephone and/or to reduce glare on the telephone due to ceiling, wall, window or desktop lighting. The stand is ergonomic in design. The stand serves to protect the finish of the surface upon which the telephone sits. The stand serves to reduce sliding of the telephone on the surface upon which the telephone sits by having one or more foot portions formed of anti-slip, increased friction material. Although metal plates have been illustrated in the stand and magnets have been illustrated in the bottom of the telephone, it should be appreciated that these locations may be reversed.

Figure 8:
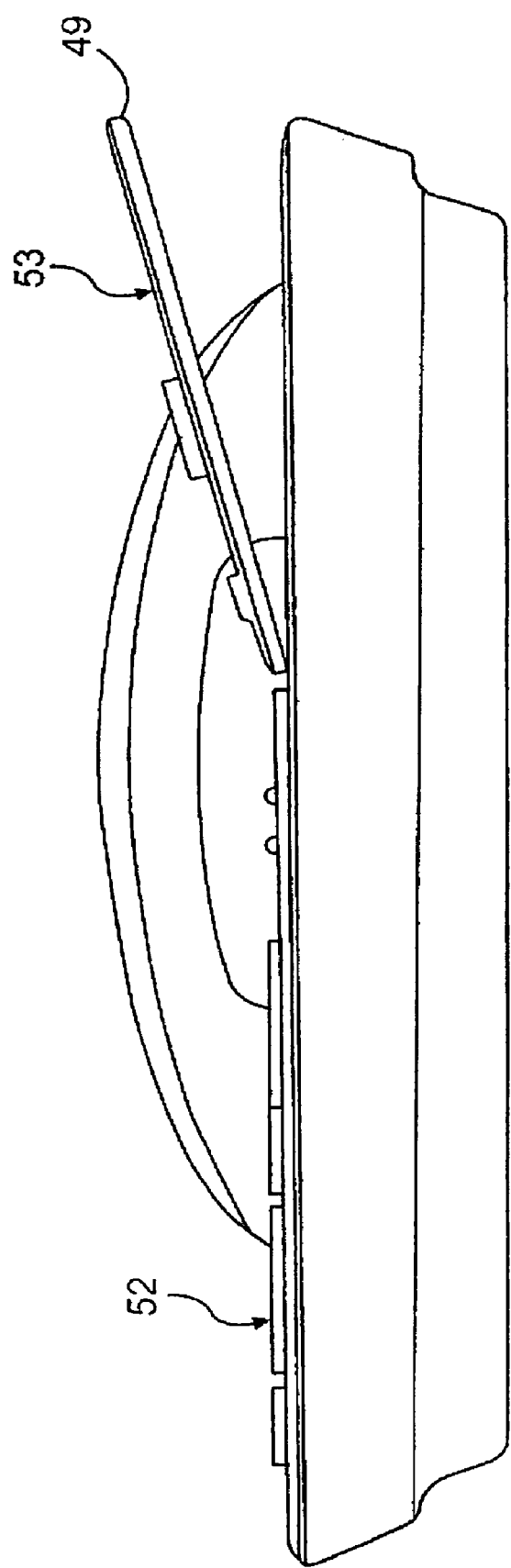
FIG. 8 is a right side view of the telephone with the stand removed, illustrating a display in a tilted position.

Now, with reference to FIG. 8, a further angular adjustment feature, in accordance with the present invention, will be described. As seen in FIG. 8 a top surface 52 of the telephone includes a display unit 53. The display unit 53 includes a plastic housing 55 and a display 57, such as an LCD display (See FIG. 9). The display unit 53 is attached to the telephone by a hinge 59. A user may grasp an edge of the display unit 53, such as near the top 49 of the telephone and pivot the display unit 53 away from the telephone.

Figure 9:
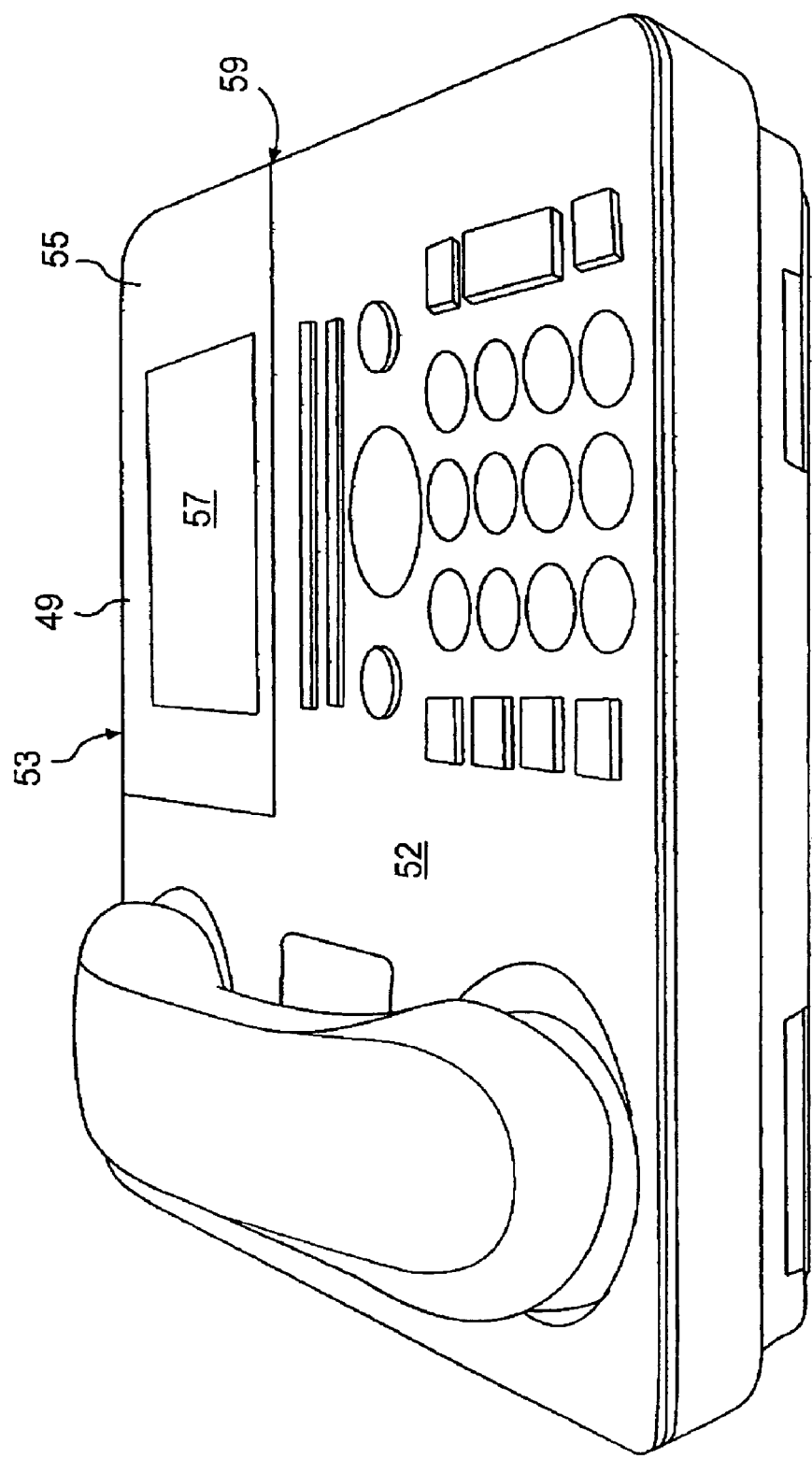
FIG. 9 is a top view of the telephone of FIG. 8, illustrating the display in a seated position.

FIG. 8 illustrates the display unit 53 being pivoted away from the top surface 52 of the telephone by an angle of approximately 25 degrees. FIG. 9 illustrates the display unit 53 being positioned co-planar with the top surface 52 of the telephone at an angle of approximately zero degrees. In practice, the hinge 59 would include an internal resistance, which allows the user to pivot the display unit 53 to a desire angle and release the display unit 53. The internal resistance of the hinge 59 would be sufficient to hold the display unit 53 at the user-selected angle, i.e. at the position where the user released the display unit 53 during the pivoting action. In accordance with one embodiment of the present invention, the hinge would allow the display unit to pivot up to a 40 degree angle relative to the top surface 52 of the telephone.

Therefore, in accordance with this further embodiment of the present invention, the user now has a wide selection of angles at which the display unit 53 may be angled relative to the perspective of the user, while seated at a desk. First, the user selects between two course angle adjustments of the top surface 52 of the telephone itself. The course angle adjustment may be accomplished via the user selected orientation of the stand, such as 30 degrees or 60 degrees, or perhaps between 20 degrees and 50 degrees (depending upon the shape of the stand employed). Next, the user may select a fine tuned angular adjustment for the display unit 53. For example, if the stand were used to set the telephone angle at 30 degrees relative to horizontal, then the user could select any angle between 30 degrees and 70 degrees for the display unit relative to horizontal, by pivoting the display unit 53 using the hinge 59.

The above embodiments provided two course angle adjustments for the telephone, via two possible orientations of the stand. Now, alternate embodiments will be described which provide more than two course angle adjustments for the telephone, by providing more than two orientations of the stand.

Figure 10:
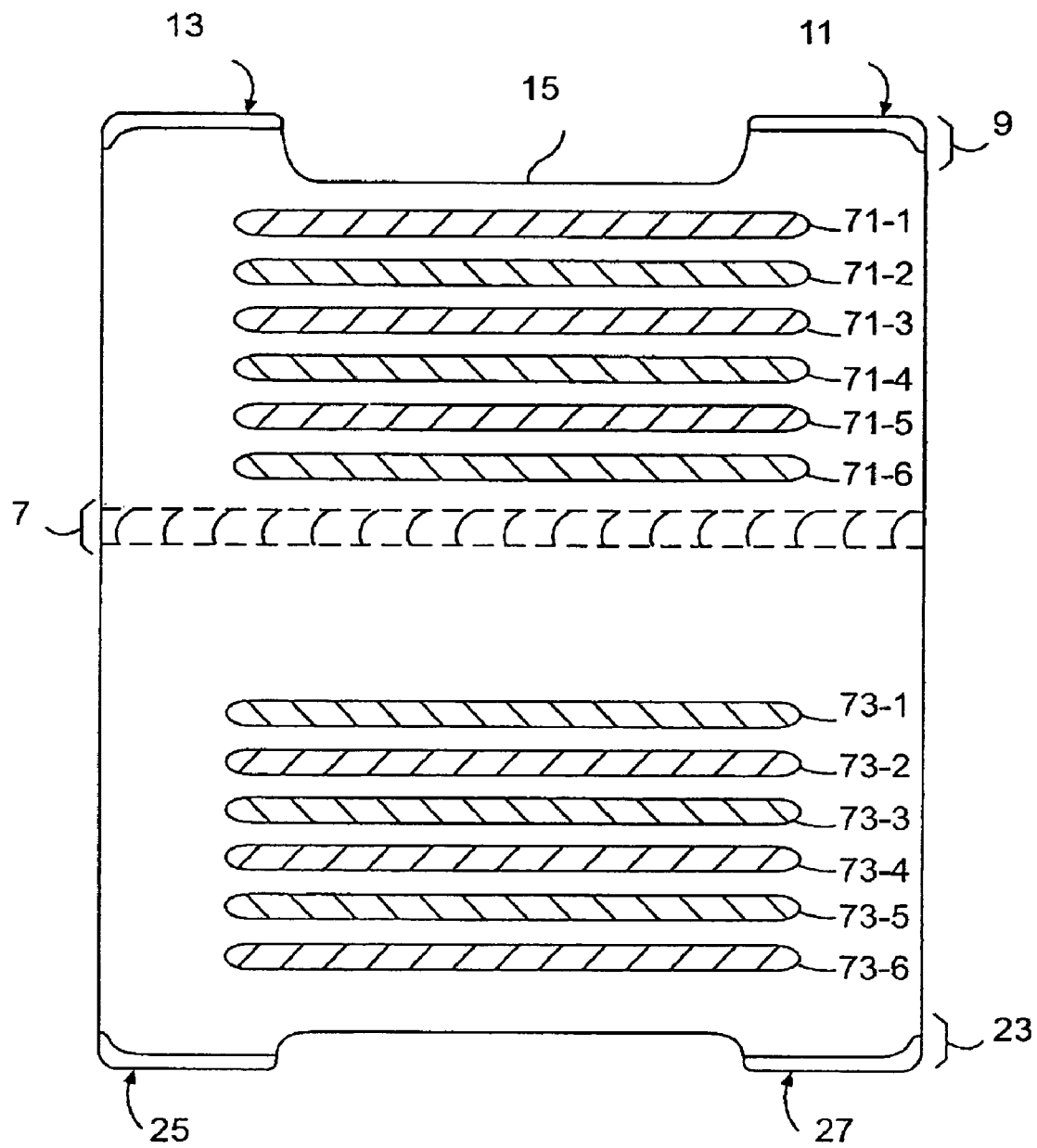
FIG. 10 is a plan view of a stand in accordance with a second embodiment of the present invention.

FIG. 10 illustrates a stand in accordance with a first alternative embodiment wherein plural first metal plates 71 are embedded within the first generally planar surface 1, and plural second metal plates 73 are embedded within the second generally planar surface 3. Of course, the first and second plural metal plates 71 and 73 could be surface mounted rather than embedded. Also, the first and second plural metal plates 71 and 73 could be metal fibers embedded in strips within a plastic material of the stand. In FIG. 10, six first metal plates/strips 71 are shown and six second metal plates/strips 73 are shown. Of course, this number may be varied. Also, the spacing between the metal plates/strips 71 and 73 is illustrated as being equal, but could be otherwise.

Figure 11:
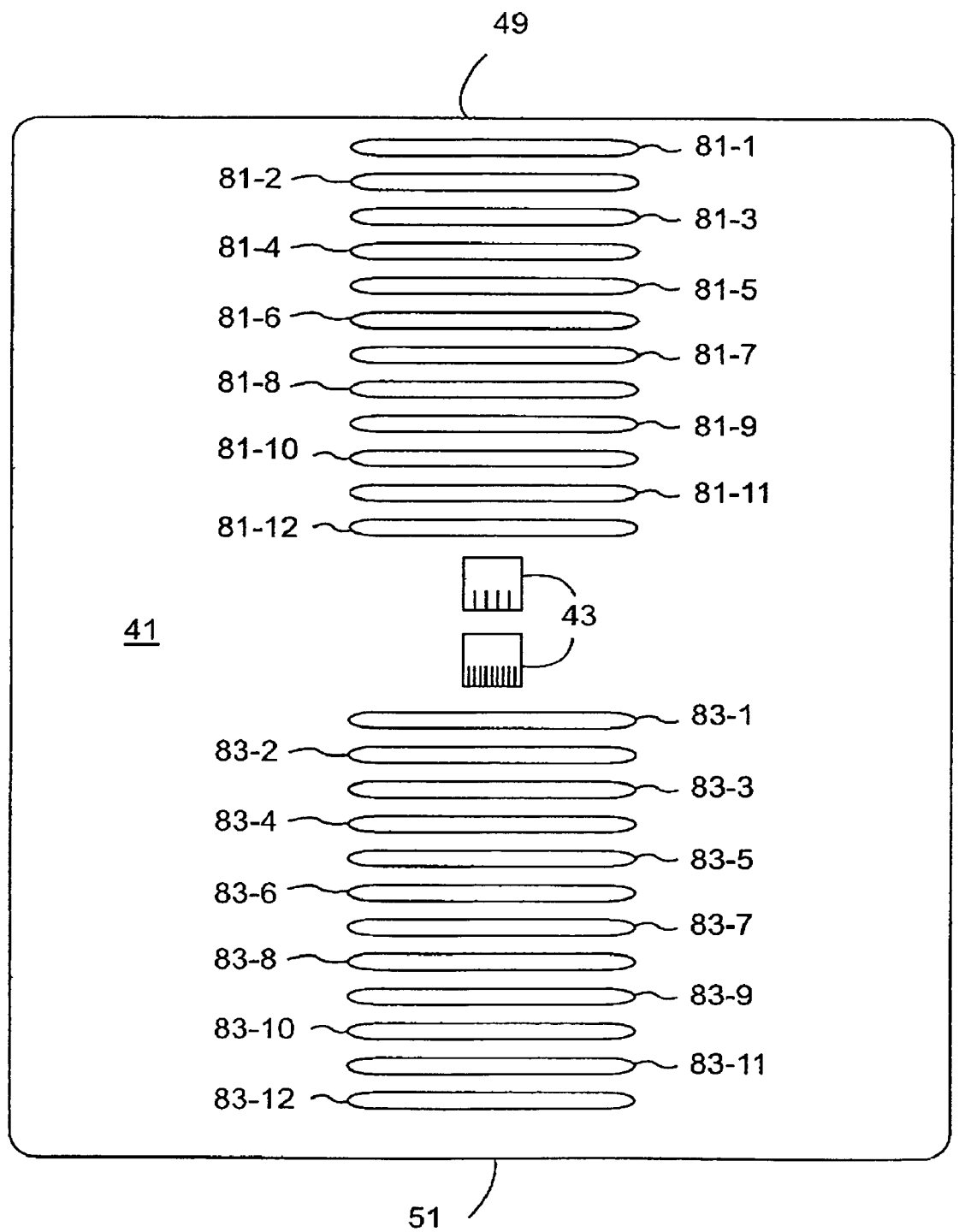

The telephone, for the first alternative embodiment, is illustrated in FIG. 11. As can be seen in FIG. 11, the bottom surface 41 of the telephone includes plural first magnet strips 81 and plural second magnet strips 83. The plural first magnet strips 81 are located between the jack 43 and the top edge 49 of the telephone. The plural second magnet strips 83 are located between the jack 43 and the bottom edge 51 of the telephone. Of course, the magnets could be embedded in a plastic housing of the telephone, surface mounted on the bottom surface 41 of the telephone, or magnetic fibers embedded into the plastic forming the bottom surface 41 of the telephone during a molding process. In FIG. 11, twelve first magnet strips 81 are shown and twelve second magnet strips 83 are shown. Of course, this number may be varied. Also, the spacing between the magnet strips 81 and 83 is illustrated as being equal and the same as the spacing between the metal plates/strips 71 and 73, but could be otherwise.

Figure 12:
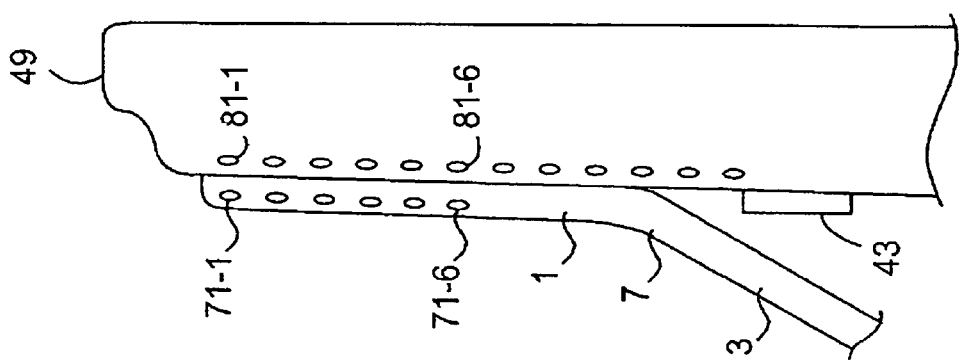
FIG. 12 is a left side cross sectional view of the stand of FIG. 10 attached to the telephone of FIG. 11 in a first location along a bottom of the telephone.

As shown in FIG. 12, when the first metal strips 71 of the stand are placed adjacent to the first magnet strips 81, a magnetic attraction holds the stand to the bottom surface 41 of the telephone. FIG. 12 is a cross sectional view illustrating a registration of all six of the first metal strips 71 with the top six of the first magnet strips 81 (i.e. magnet strips 81-1 through 81-6). When the stand is used to support the telephone in this orientation, the telephone will be oriented the same as depicted in FIG. 6.

Figure 13:
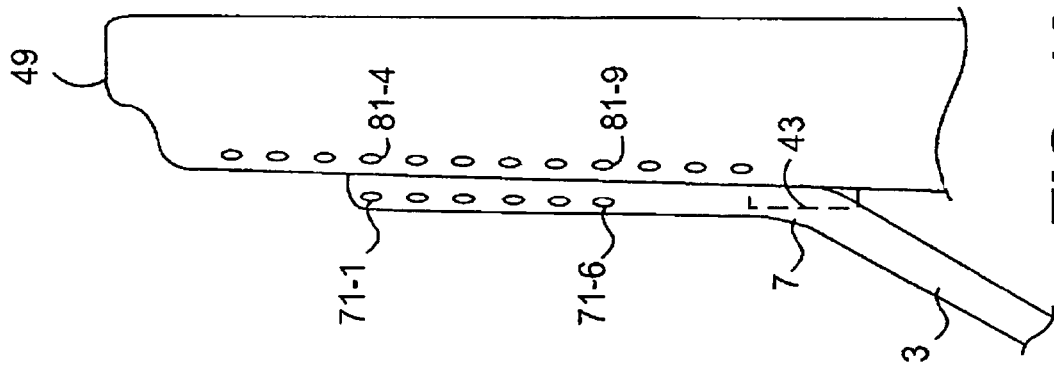
FIG. 13 is a left side cross sectional view of the stand of FIG. 10 attached to the telephone of FIG. 11 in a second location along the bottom of the telephone.

FIG. 13 is a cross sectional view illustrating a registration of six of the first metal strips 71 with six of the top nine of the first magnet strips 81 (i.e. magnet strips 81-4 through 81-9). When the stand is used to support the telephone in this orientation, the telephone will be oriented at a slightly different angle than illustrated in FIG. 6, giving the user more course angle adjustment flexibility. Also in FIG. 13, the jack 43 is residing within the slot 19. It is possible that less than six of the first metal strips 71 could be in registration with the first magnet strips 81, which would provide more than six different positions to attach the first generally planar surface 1 of the stand to the bottom surface 41 of the telephone.

Figure 14:
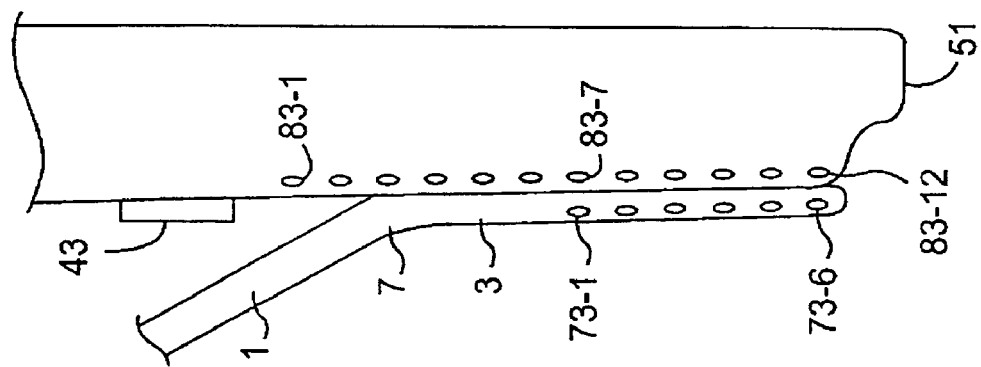
FIG. 14 is a left side cross sectional view of the stand of FIG. 10 attached to the telephone of FIG. 11 in a third location along the bottom of the telephone.

FIG. 14 is a cross sectional view illustrating a registration of all six of the second metal strips 73 with the bottom six of the second magnet strips 83 (i.e. magnet strips 83-7 through 83-12). When the stand is used to support the telephone in this orientation, the telephone will be oriented the same as depicted in FIG. 7.

Figure 15:
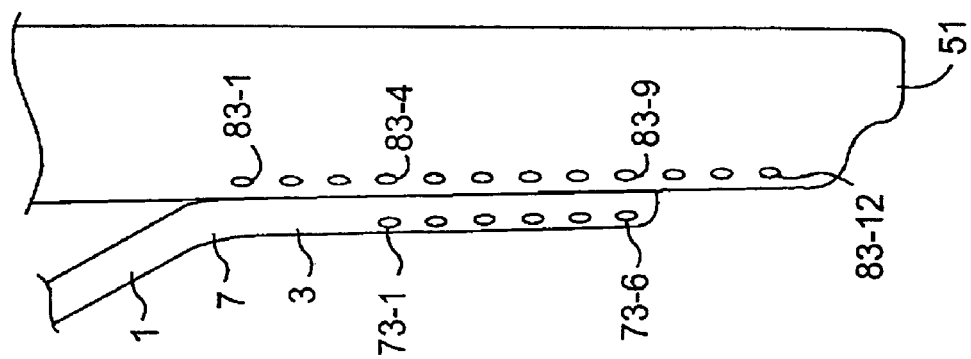
FIG. 15 is a left side cross sectional view of the stand of FIG. 10 attached to the telephone of FIG. 11 in a fourth location along the bottom of the telephone.

FIG. 15 is a cross sectional view illustrating a registration of six of the second metal strips 73 with six of the second magnet strips 83 (i.e. magnet strips 83-4 through 83-9). When the stand is used to support the telephone in this orientation, the telephone will be oriented at a slightly different angle than illustrated in FIG. 7, again illustrating the user's flexibility in picking a desired angle for the telephone.

Figure 16:
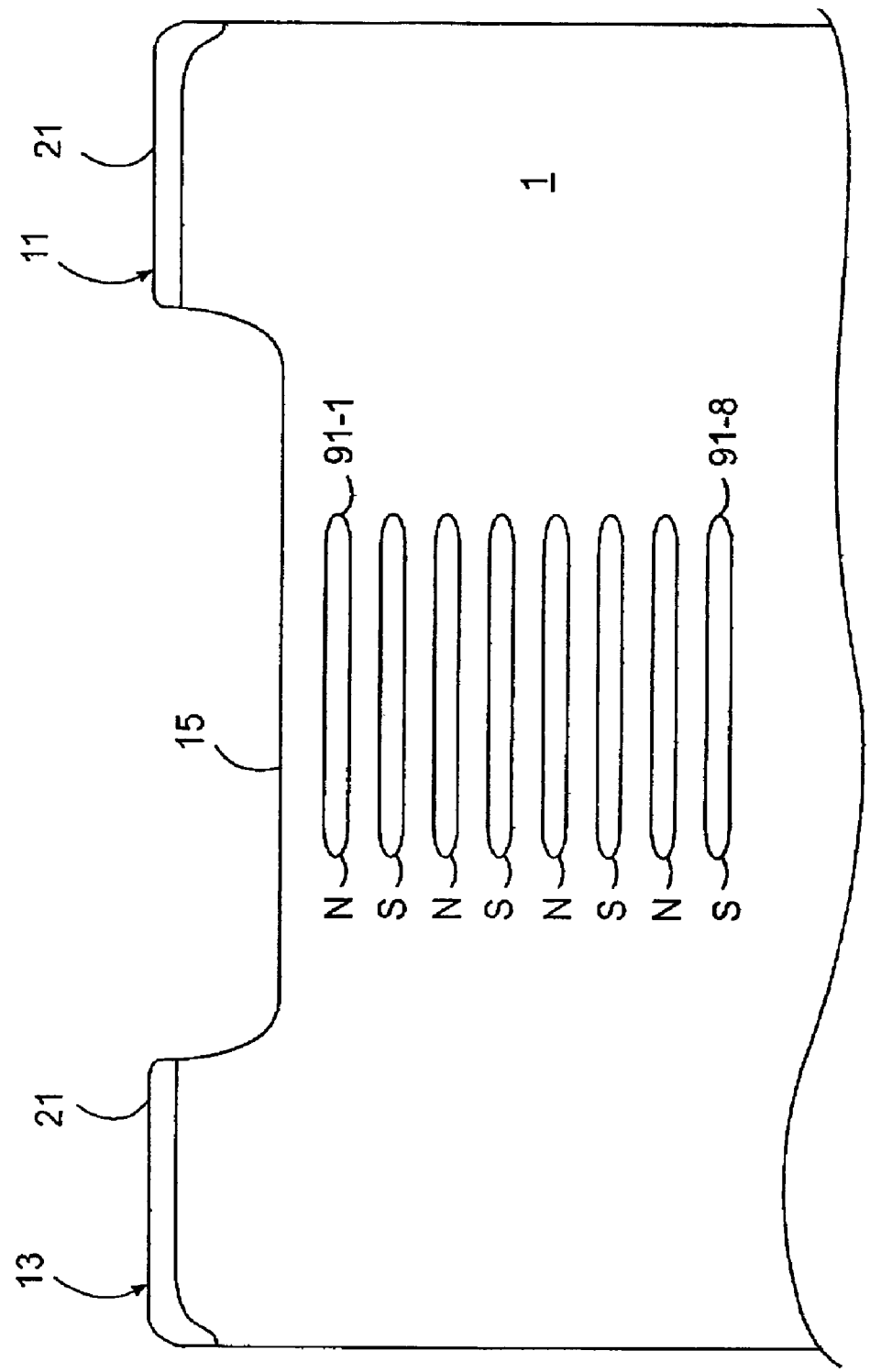
FIG. 16 is a plan view of a first end of a stand in accordance with a third embodiment of the present invention.
Figure 17:
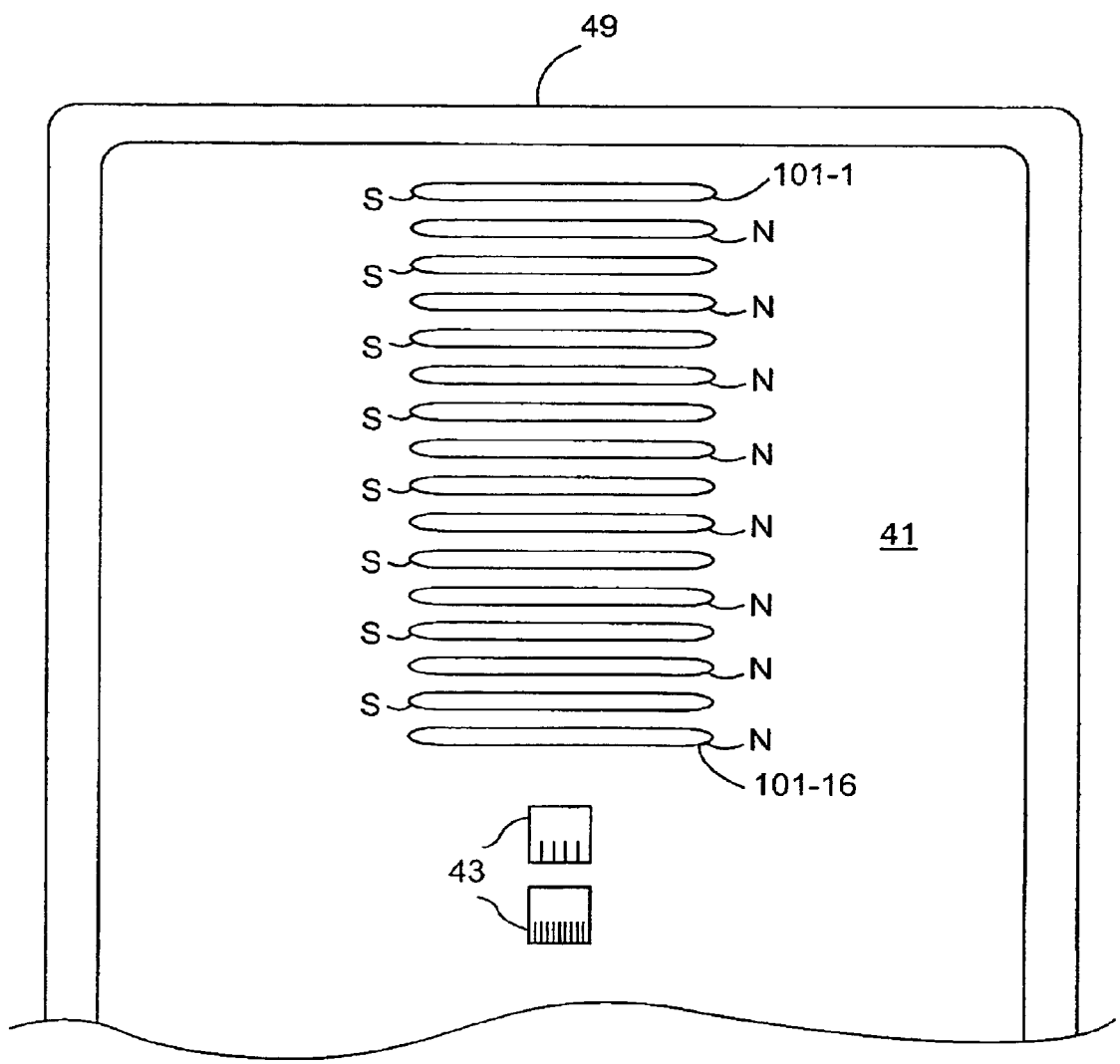

In an alternate embodiment to FIGS. 10-15, magnet strips are embedded within, or placed on, both the first and second generally planar surfaces 1 and 3 of the stand, as well as the bottom surface 41 of the telephone. FIG. 16 illustrates eight alternating positive/negative pole magnetic strips 91 on the first generally planar surface 1 of the stand. FIG. 17 illustrates sixteen alternating positive/negative pole magnets 101 located on the bottom surface 41 of the telephone between the jack 43 and the top edge 49 of the telephone. Note that the first magnet 101-1 of the telephone is a south pole magnet so as to attract the first magnet 91-1 of the stand. Of course, magnetic strips and magnets would also be located on the second generally planar surface 3 of the stand, and between the jack 43 and the bottom edge 51 of the telephone. However, theses structures have been omitted to clarify the drawing figures.

Figure 18:
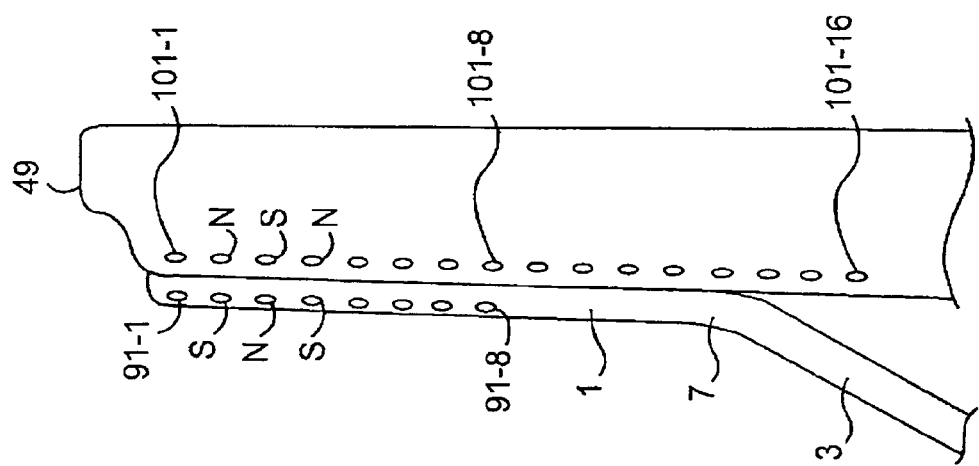
FIG. 18 is a left side cross sectional view of the stand of FIG. 16 attached to the telephone of FIG. 17 in a first location along the bottom of the telephone.

When the first magnet strips 91 of the stand are placed adjacent to the first magnet strips 101 of the telephone, a mutual magnetic attraction holds the stand to the bottom surface 41 of the telephone. FIG. 18 is a cross sectional view illustrating a registration of all eight of the first magnet strips 91-1-91-8 with the top eight of the first magnet strips 101 (i.e. magnet strips 101-1 through 101-8). When the stand is used to support the telephone in this orientation, the telephone will be oriented the same as depicted in FIG. 6.

Figure 19:
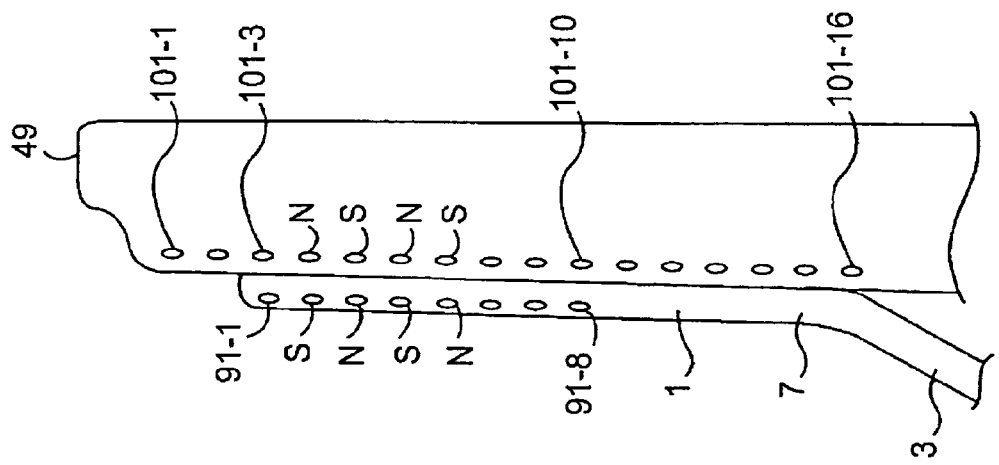
FIG. 19 is a left side cross sectional view of the stand of FIG. 16 attached to the telephone of FIG. 17 in a second location along the bottom of the telephone.

FIG. 19 is a cross sectional view illustrating a registration of eight of the first magnet strips 91-1-91-8 with eight of the top ten first magnet strips 101 (i.e. magnet strips 101-3 through 101-10). When the stand is used to support the telephone in this orientation, the telephone will be oriented at a slightly different angle than depicted in FIG. 6. Hence, the system would have four possible positions. However, it is possible that less than eight of the first magnet strips 91 could be in registration with the first magnet strips 101, which would provide more than four different positions to attach the first generally planar surface 1 of the stand to the bottom surface 41 of the telephone.

The second planar surface 3 of the stand could be attached to the bottom surface 41 of the telephone in various positions in a like manner.

The alternating positive/negative pole magnet arrangement is particularly advantageous in that the stand resists sliding on the bottom surface 41 of the telephone. In other words, the pressure applied to the telephone when the user dials or replaces the handset will not cause the generally planar surface 1 or 3 of the stand to slide on the bottom surface 41 of the telephone so as to change the angle orientation of the telephone. This resistance to sliding is due to the magnetic repulsion forces of the alternating pole placement of the magnets.

The embodiments of FIGS. 10-19 allow the user to have a broader spectrum of course angular adjustment of the telephone relative to the desktop, e.g. relative to a horizontal plane. Of course, the embodiments of FIGS. 10-19 could still include the tiltable display unit 53, if desired.

Although a desktop telephone has been illustrated as being supported by the stand, it should be appreciated that other types of equipment may be supported by the illustrated inventive stand, such as a calculator, clock, radio, CD or MP3 player, IPOD, speaker, volt meter, test equipment etc.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A combination comprising:
   a stand including:
      a first generally planar surface having a first edge;
      a second generally planar surface attached to said first generally planar surface at an angle, said second generally planar surface having a second edge;
      a first magnet attached to, or located within, said first generally planar surface; and
      a second magnet attached to, or located within, said second generally planar surface,
      wherein when said first magnet is magnetically attracted to an appliance at least partially supported by said stand, said second edge engages a support surface; and
      wherein when said second magnet is magnetically attracted to the appliance at least partially supported by said stand, said first edge engages the support surface.

2. The combination according to claim 1, wherein said angle between said first generally planar surface and said second generally planar surface is greater than 90 degrees.

3. The combination according to claim 1, wherein said first generally planar surface is formed of plastic and said first magnet is embedded into and surrounded by said plastic forming said first generally planar surface; and wherein said second generally planar surface is formed of plastic and said second magnet is embedded into and surrounded by said plastic forming said second generally planar surface.

4. The combination according to claim 1, wherein said first edge includes first and second foot portions for engaging the support surface, and said second edge includes third and fourth foot portions for engaging the support surface.

5. The combination according to claim 4, further comprising a rubberized material attached to said first, second, third and fourth foot portions.

6. The combination according to claim 1, wherein when said second magnet is magnetically attracted to an appliance at least partially supported by said stand, said second edge also engages the support surface.

7. The combination according to claim 1, wherein said first magnet includes a plurality of first magnets, each of said plurality of first magnets being attached to, or located within, said first generally planar surface; and wherein said second magnet includes a plurality of second magnets, each of said plurality of second magnets being attached to, or located within, said second generally planar surface.

8. The combination according to claim 7, wherein said plurality of first magnets alternate polarity between north and south pole magnets, and wherein said plurality of second magnets alternate polarity between north and south pole magnets.

9. The combination according to claim 7, further comprising:
   a telephone including:
      a plurality of first magnetizable materials attached to, or located within, a bottom surface of said telephone; and
      a plurality of second magnetizable materials attached to, or located within, said bottom surface of said telephone, wherein when said plurality of first magnetizable materials are magnetically attracted to said plurality of first magnets of said stand, a bottom edge of said telephone engages the support surface.

10. The combination according to claim 7, further comprising:
   a telephone including:
      a plurality of third magnets attached to, or located within, a bottom surface of said telephone; and
      a plurality of fourth magnets attached to, or located within, said bottom surface of said telephone, wherein when said plurality of third magnets are magnetically attracted to said plurality of first magnets of said stand, a bottom edge of said telephone engages the support surface.

11. The combination according to claim 1, further comprising:
   a telephone including:
      a first magnetizable material or magnet attached to, or located within, a bottom surface of said telephone; and a second magnetizable material or magnet attached to, or located within, said bottom surface of said telephone, wherein when said first magnetizable material or magnet is magnetically attracted to said first magnet of said stand, a bottom edge of said telephone engages the support surface.

12. The combination according to claim 11, wherein when said first magnetizable material or magnet is magnetically attracted to said first magnet of said stand, said telephone assumes a tilted orientation of between 40 to 70 degrees relative to the support surface, and wherein when said second magnetizable material or magnet is magnetically attracted to said second magnet of said stand, said telephone assumes a tilted orientation of between 20 to 35 degrees relative to the support surface.

13. The combination according to claim 11, further comprising:
at least one jack formed in said bottom surface of said telephone; and
a through hole in the form of a slot located generally in a center of said stand, wherein said slot allows access to said at least one jack when said stand at least partially supports said telephone.

14. The combination according to claim 11, further comprising:
a display unit on a top surface of said telephone; and
a hinge connecting said display unit to said top surface of said telephone such that said display unit can be pivoted away from said top surface of said telephone about said hinge to a user selected angle.

15. A combination comprising:
a stand including:
a first generally planar surface having a first edge;
a second generally planar surface attached to said first generally planar surface at an angle, said second generally planar surface having a second edge;
a first magnetizable material attached to, or located within, said first generally planar surface; and
a second magnetizable material attached to, or located within, said second generally planar surface,
wherein when said first magnetizable material is magnetically attracted by an appliance at least partially supported by said stand, said second edge engages a support surface; and
wherein when said second magnetizable material is magnetically attracted by the appliance at least partially supported by said stand, said first edge engages the support surface.

16. The combination according to claim 15, wherein said angle between said first generally planar surface and said second generally planar surface is greater than 90 degrees.

17. The combination according to claim 15, wherein said first generally planar surface is formed of plastic and said first magnetizable material is embedded into and surrounded by said plastic forming said first generally planar surface; and wherein said second generally planar surface is formed of plastic and said second magnetizable material is embedded into and surrounded by said plastic forming said second generally planar surface.

18. The combination according to claim 15, wherein said first magnetizable material includes a plurality of first magnetizable materials, each of said plurality of first magnetizable materials being attached to, or located within, said first generally planar surface; and wherein said second magnetizable material includes a plurality of second magnetizable materials, each of said plurality of second magnetizable materials being attached to, or located within, said second generally planar surface.

19. The combination according to claim 18, further comprising:
a telephone including:
a plurality of first magnets attached to, or located within, a bottom surface of said telephone; and
a plurality of second magnets attached to, or located within, said bottom surface of said telephone, wherein when said plurality of first magnets are magnetically attracted to said plurality of first magnetizable materials of said stand, a bottom edge of said telephone engages the support surface.

20. The combination according to claim 16, further comprising:
a telephone including:
a first magnet attached to, or located within, a bottom surface of said telephone; and
a second magnet attached to, or located within, said bottom surface of said telephone, wherein when said first magnet is magnetically attracted to said first magnetizable material of said stand, a bottom edge of said telephone engages the support surface.

21. The combination according to claim 20, wherein when said first magnet is magnetically attracted to said first magnetizable material of said stand, said telephone assumes a tilted orientation of between 40 to 70 degrees relative to the support surface, and wherein when said second magnet is magnetically attracted to said second magnetizable material of said stand, said telephone assumes a tilted orientation of between 20 to 35 degrees relative to the support surface.

22. The combination according to claim 20, further comprising:
at least one jack formed in said bottom surface of said telephone; and
a through hole in the form of a slot located generally in a center of said stand, wherein said slot allows access to said at least one jack when said stand at least partially supports said telephone.

23. The combination according to claim 20, further comprising:
a display unit on a top surface of said telephone; and
a hinge connecting said display unit to said top surface of said telephone such that said display unit can be pivoted away from said top surface of said telephone about said hinge to a user selected angle.

24. A combination comprising:
an appliance; and
a stand including:
a first generally planar surface;
a second generally planar surface attached to said first generally planar surface at an angle;
a first magnet attached to, or located within, said first generally planar surface; and
a second magnet attached to, or located within, said second generally planar surface,
wherein said appliance includes:
a first magnetizable material or magnet attached to, or located within, a bottom surface of said appliance; and
a second magnetizable material or magnet attached to, or located within, said bottom surface of said appliance;
wherein when said first magnetizable material or magnet is magnetically attracted to said first magnet of said stand, said appliance is supported by said stand and assumes a first tilted orientation relative to a support surface beneath said stand; and wherein when said second magnetizable material or magnet is magnetically attracted to said second magnet of said stand, said appliance is supported by said stand and assumes a second tilted orientation relative to the support surface beneath said stand, where said second tilted orientation is different from said first tilted orientation.

25. The combination according to claim 24, wherein said appliance is a telephone.

26. A combination comprising:
an appliance; and
a stand including:
- a first generally planar surface;
- a second generally planar surface attached to said first generally planar surface at an angle;
- a first magnetizable material attached to, or located within, said first generally planar surface; and
- a second magnetizable material attached to, or located within, said second generally planar surface, wherein said appliance includes:
- a first magnet attached to, or located within, a bottom surface of said appliance; and
- a second magnet attached to, or located within, said bottom surface of said appliance;

wherein when said first magnet is magnetically attracted to said first magnetizable material of said stand, said appliance is supported by said stand and assumes a first tilted orientation relative to a support surface beneath said stand; and wherein when said second magnet is magnetically attracted to said second magnetizable material of said stand, said appliance is supported by said stand and assumes a second tilted orientation relative to the support surface beneath said stand, where said second tilted orientation is different from said first tilted orientation.

27. The combination according to claim 26, wherein said appliance is a telephone.

* * * * *